July 14, 1959 W. F. WINGARD ET AL 2,894,711
VIBRATION ISOLATOR AND SHOCK MOUNT
Filed May 11, 1956 3 Sheets-Sheet 1
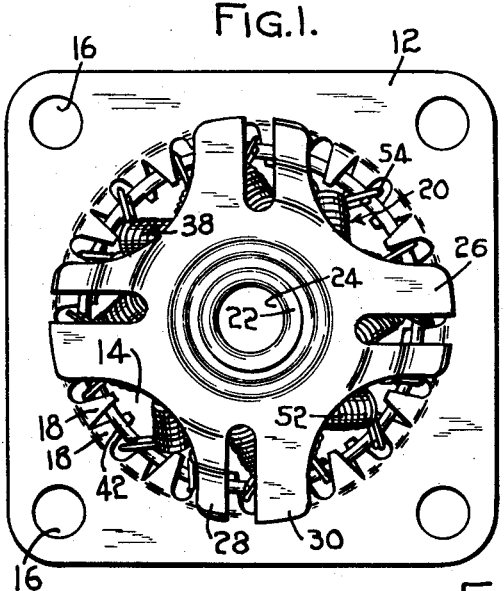
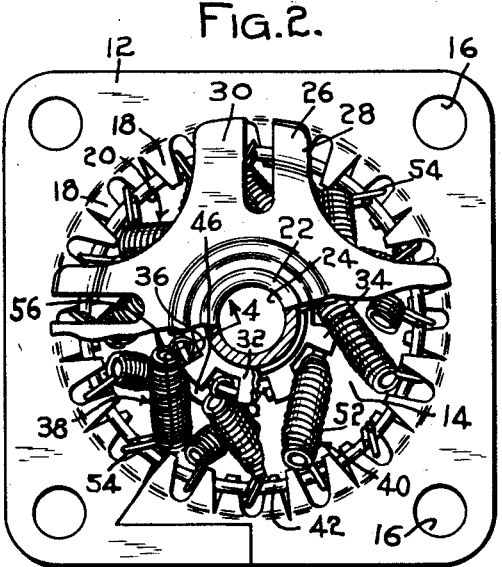
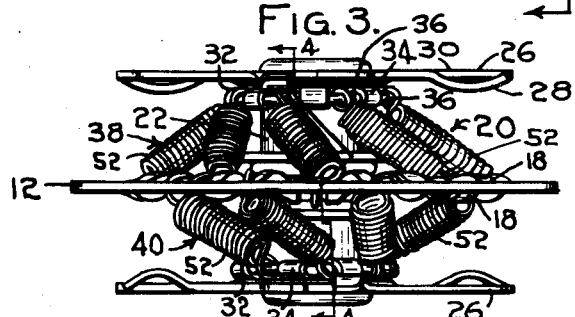
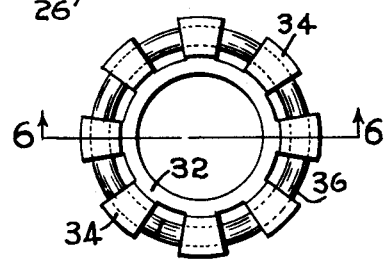
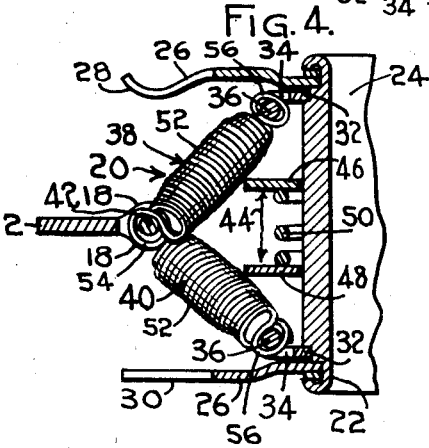
INVENTORS:
WILLIAM F. WINGARD,
RAYMOND A. GOSSELIN,
BY Philip E. Parker
ATTORNEY.

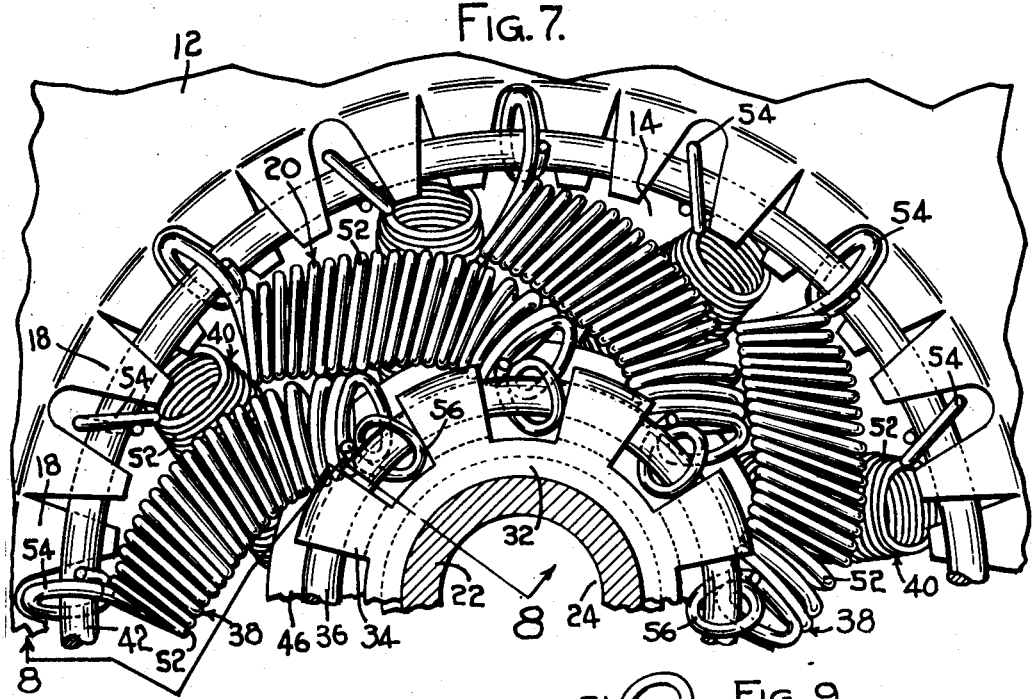
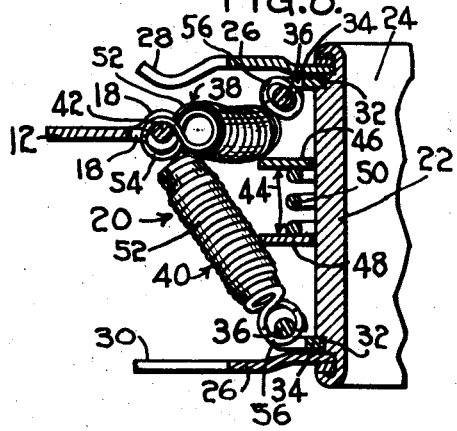
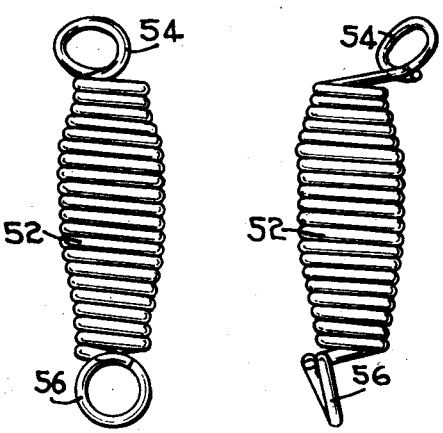

July 14, 1959 W. F. WINGARD ET AL 2,894,711
VIBRATION ISOLATOR AND SHOCK MOUNT
Filed May 11, 1956 3 Sheets-Sheet 3
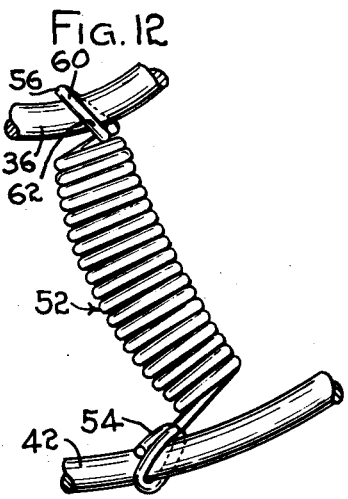
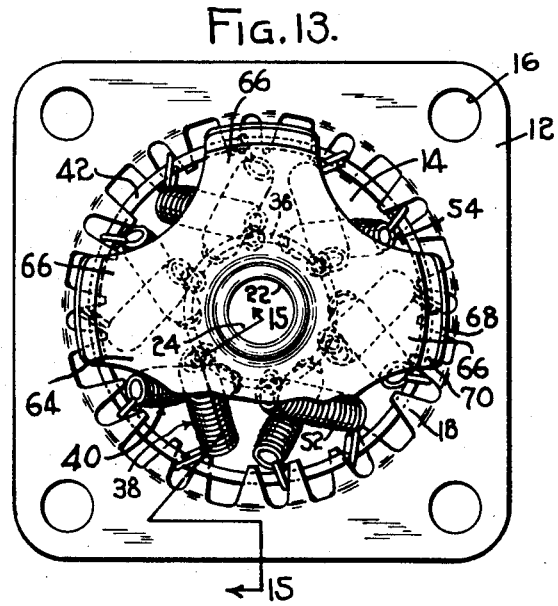
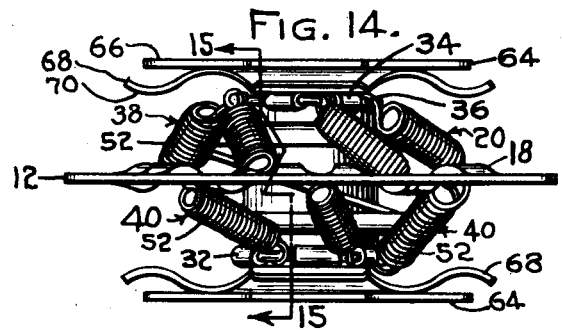
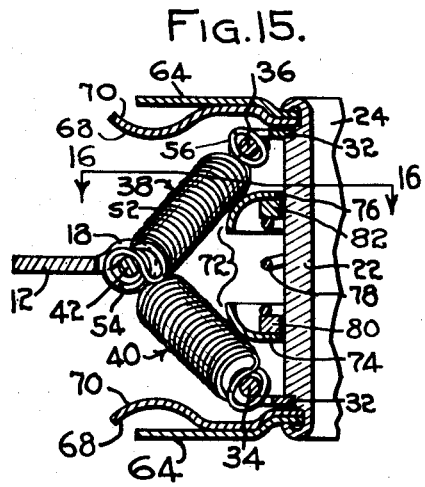
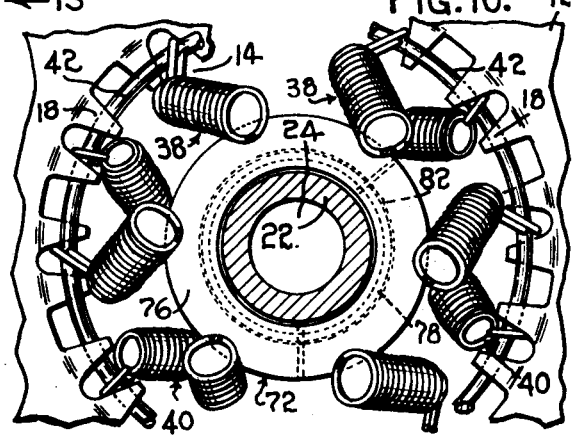
INVENTORS:
WILLIAM F. WINGARD,
RAYMOND A. GOSSELIN,
BY Philip E. Parker
ATTORNEY.

United States Patent Office 2,894,711
Patented July 14, 1959

2,894,711
VIBRATION ISOLATOR AND SHOCK MOUNT

William F. Wingard, Newtonville, and Raymond A. Gosselin, Cambridge, Mass., assignors of one-half to A. Wells & Company Limited, London, England, a British company, and one-half to United-Carr Fastener Corporation, Cambridge, Mass., a corporation of Delaware Application May 11, 1956, Serial No. 584,217

6 Claims. (Cl. 248—358)

This invention relates to vibration isolators and shock mounts and more particularly to the type of vibration isolator and shock mount that utilizes two sets of helical coil springs disposed in opposed frusto-conical relationship.

Mounts of this type are shown and taught by the patent to Barber et al., No. 2,600,690, dated June 10, 1952. This type of mount has proven to have a number of very valuable features. When constructed of suitable metals, this type of mount is adapted for use in installations where it is subject to wide ranges of temperature and atmospheric conditions.

It has been found desirable to provide a vibration isolator and shock mount which will be useful in isolating a load from a support subject to a wide range of vibrations. This is particularly true in the mounting of electronic control equipment in aircraft, in tanks or in naval vessels. Particularly in aircrafts the mounts are subjected to temperatures ranging to many degrees below zero, at which temperatures many of the materials commonly used for vibration isolation solidify and become brittle. Also the supersonic speeds and the fast maneuverability of the modern military aircraft combine to induce in the structural parts of aircraft and in the equipment secured to aircraft excessive stresses and strains. Consequently, vibration isolators and shock mounts used in such aircraft must be able not only to isolate the electronic equipment from the vibrations caused by the motor and the airstream, but also must be able to withstand the terrific forces generated during the quick maneuvers of which such craft are capable.

Accordingly, one of the objects of the present invention is to provide an improved vibration isolator and shock mount of the type referred to above that will be able to isolate substantially a load from a wide range of vibrations and at the same time be capable of effectively resisting heavy shocks.

Another principal object of the present invention is to provide an improved vibration isolator and shock mount whose construction is such that the mount will have a longer life than the previously known mounts, particularly when the mounts are subjected to vibration frequencies which induce resonant vibrations in the mount structure.

Another object is to provide an improved mount having an improved vibration damping construction.

Still another object is to provide a vibration isolator and shock mount incorporating improved resilient stop element.

Other features and objects of the present invention will be apparent from the description which follows, with reference to the accompanying drawings, illustrating by way of example several embodiments of this invention.

In the drawings:

Fig. 1 is a plan view of a vibration isolator and shock mount embodying the invention;

Fig. 2 is a plan view similar to Fig. 1, but with the nearer portion of the structure broken away to reveal the interior of the mount;

Fig. 3 is a side elevation of the mount of Fig. 1;

Fig. 4 is a partial cross sectional view taken along lines 4—4 in Figs. 2 and 3;

Fig. 5 is a plan view of one of the spring mounting rings of the shock mount of Fig. 1;

Fig. 6 is a sectional view taken along line 6—6 of Fig. 5;

Fig. 7 is an enlarged partial cutaway plan view of the shock mount of Fig. 1 showing the interior spring structure in overloaded condition;

Fig. 8 is a section taken on approximately line 8—8 of Fig. 7;

Fig. 9 is a plan view of a coil spring used in the mount of Fig. 1;

Fig. 10 is a side elevation of the coil spring of Fig. 9;

Fig. 11 is a side elevation of the coil spring of Fig. 9 in a plane approximately perpendicular to the elevation plane of Fig. 10;

Fig. 12 is an enlarged cross sectional view of a helical coil spring in normal unloaded position in the embodiment of the invention shown in Fig. 4;

Fig. 13 is a plan view of another embodiment of the invention with the nearer portion of the structure broken away in the same manner as Fig. 2 to reveal the interior of the mount;

Fig. 14 is a side elevation of the mount of Fig. 13;

Fig. 15 is a partial cross sectional view taken along lines 15—15 in Figs. 13 and 14; and Fig. 16 is an enlarged partial cut-away plan view of the shock mount of Fig. 13 taken on line 16—16 of Fig. 15.

One form of a vibration isolator and shock mount embodying the invention is shown in the drawings in Figs. 1 through 12 as having a base member 12, preferably of metal, with a central aperture 14 and means on the outer periphery thereof such as holes 16 for securing it to a support. Around the edges of the central aperture 14 means such as fingers 18 may be provided for securing the resilient spring structure 20 of the mount. A columnar member 22 is provided for attaching the mount 10 to the load (not shown) to be supported. The columnar member 22 is normally, when not loaded, supported by the spring structure 20 so that it is disposed in the center of the aperture 14 of the base member 12 with the axis of the columnar member 22 extending normal to the plane of the base member 12.

The columnar member 22 may have a bore 24 extending axially through it so that a mounting bolt may be inserted for attaching the columnar member to a load to be supported. Resilient stop members 26 are secured at opposite ends of the columnar member 22. The stop members 26 have their outer ends disposed, when the columnar member is centrally positioned in the apertured base member, so that their outer ends overlie the edges of the aperture 14 in the base member 12. The stop members are formed of spring metal and have in the embodiment shown Figs. 1 through 4 four pairs of spring arms extending outwardly and laterally from a central portion. One member 28 of each pair of spring arms is shown as being narrower than the other member 30. The narrower member 28 is curved downwardly and then upwardly at the end, while the other member extends straight outwardly. The downwardly curved narrower member provides a resilient stop in the event of excessive shocks.

At the opposite ends of the columnar member 22 are disposed spring carriers 32. These carriers are apertured plates with outwardly extending fingers 34 which are curled over to grasp the wire 36 securing the coil springs. The spring carriers 32 are mounted in fixed axial relation to the columnar member 22, but are free to rotate around the columnar member 22, subject to some frictional resistance between each carrier and the columnar member.

The columnar member 22 is held in position and supported by a spring structure 20 having two sets of helical coil springs, 38 and 40, the springs of one set 38 are attached to the spring carrier at one end of the columnar member 22 and extend to the edges of the aperture 14 in the base member 12 where the outwardly bent end coils of the springs are secured by the wire 42 and the fingers 18 at the edges of the aperture 14 of the base member 12. When the mount is in normal unloaded condition the springs of each set are so disposed that their axes are substantially on the outer surface of an imaginary cone with a base at the base member 12 and an apex on the axis of the columnar member 22.

Surrounding the columnar member 22 there may be a frictional damping cage 44 comprising two flat ring members 46, 48 which are free to move along the columnar member 22 and to rotate around it. A helical coil spring 50 urges the two ring members 46, 48 apart and thereby urges the peripheral edges thereof into frictional engagement with the helical coil springs as shown.

Each of the helical coil springs 52 is formed so that the end convolutions of the coil springs have increasingly smaller diameters toward the end than the convolutions in the central portion. The end convolutions of each helical coil spring 52 are formed or bent so that they lie substantially in planes perpendicular to the axis of the spring as indicated in Figs. 9, 10, 11 and 12. Fig. 12 illustrates the considerations used in determining the angular disposition of the end convolutions 54 and 56 of the helical coil spring 52. In Fig. 12 the spring is shown in cross section along a plane passing through the attaching wires 36 and 42 and the axis of the spring when the amount is in normal unloaded condition in the embodiment of the invention shown in Fig. 4. The spring is so designed that the end convolution 56 is caused to engage the inner and outer peripheral surfaces of the attaching wires 36 at points 60 and 62 while the end convolution encircles the other attaching wire 42 so as to place the spring 52 at a slight bending tension tending to form it into a slight curve as shown in Fig. 12.

In normal unloading condition of the mount the axes of the helical coil springs of each set extend at equal angles with respect to the base member 12 and the axis of the columnar member 22.

In ordinary use the base member is secured to an apertured support and the load to be supported is secured to the columnar member 22 by extending a mounting bolt through the bore 24 of the columnar member 22. The mounts may be used singly, or in pairs, or in larger groups, or in any combination desired to support a load in accordance with methods well known in the art. The size of the springs are experienmtally determined such that when a load for which a particular mount is designed is applied axially along the columnar member 22 one set of springs is caused to be slightly tensioned. If an overload is applied axially along the columnar member 22, that is, for example, three or four times the load for which the springs were designed, then the columnar member 22 is displaced axially so that the stop member is caused almost to engage the base member as shown in Fig. 8.

One set of springs is stretched substantially under tension so that the springs of that set extend at only slight angles to the base member and the springs of the other set are caused to be disposed substantially in the plane of the base member. The springs of this set become bowed with the convex portions extending outwardly toward the base member and slightly downward from the stop member. The length of the springs is such that the spring carrier to which the springs extend is caused to rotate. At the same time adjoining springs of this set may be caused to engage frictionally, thereby, providing further damping.

The damping effect of the shock mounts embodying the invention is the result of frictional forces caused by the fact that when loads are placed upon the columnar member so as to cause, for example, movement longitudinally of the colmnar member, the movement of the columnar member is in an axial direction perpendicular to the plate member so that one set of helical coil springs 40 is tensioned and the other set of helical coil springs 38 is pushed toward the plane of the plate member 12. Since the helical coils of the springs are closely wound together the spring cannot be compressed and, therefore, since the distance between the plate and the attaching ring is reduced by this movement of the columnar member, the springs 38 cause the attaching ring to rotate about the columnar member. There is, of course, a frictional resistance to this movement between the ring and the columnar member. Further movement of the columnar member with respect to the base plate in an axial direction may also cause the side edges of adjacent springs to come in frictional contact with each other. Similarly, the tensioning of springs 40 causes its spring carrier to rotate about the columnar member 22 subject to similar friction. The friction thus induced between the springs and between the rings and the columnar member provides a portion of the damping which makes the applicant's device useful. Other damping is, of course, caused by the frictional engagement of the cage with the springs.

Figs. 13 through 16 show another embodiment of the invention. In this embodiment each set of helical coil springs is shown to have only six helical coil springs with the result that the springs are positioned further apart. However, the number of springs is determined by practical considerations well known to those skilled in the art.

Parts of this embodiment similar to corresponding parts of the embodiment shown in Fig. 1 have the same reference numerals. The embodiment of Figs. 13 through 16 has a different type of stop member. As contrasted with the first embodiment discussed this embodiment shows at each end a fairly heavy stop member 64 with four arms 66 under which there is disposed another more resilient stop member 68 having resilient wings 70 curved downward from the more rigid arms of the other stop member. This construction is advantageous in that the resilient stop member serves to absorb the heavy blows or shocks more gently than would just the plain rigid stop members.

Also, this embodiment includes a different damper cage 72 surrounding the columnar member 22 comprised of two ring members 74, 76 of spring material which may be slotted to provide flexibility and which are cupped toward each other and surround the columnar member. A helical coil spring 78 surrounds the columnar member and holds the two ring members apart so as to dispose the outer curved surfaces of the cup members in frictional engagement with the helical coil springs of each set. Within each cupped ring, there may be disposed flat washers 80, 82, between the spring 78 and the ring members. This cage construction is particularly useful when the mount is subject to shocks or excessive vibrations causing the columnar member to move toward the edge of the aperture of the plate member. Then the ring members resiliently engage the surfaces of the springs. The slits in ring members permit a resilient yielding of the cage which provides a cushioning effect as well as a damping effect.

Instead of using washers 80, 82 within the cupped ring members, other similar cupped ring members may be substituted for the washers so that there will be two nested cupped ring members at each end of the spring 78.

The foregoing descriptions of several embodiments of the invention are for the purposes of illustration and are not intended to limit the invention which is claimed in the claims set forth hereinafter.

We claim:

1. A vibration isolator and shock mount comprising an apertured base member, a columnar member extending through the aperture in the base member and vibration isolation means interconnecting said base member and said columnar member, said vibration isolation means including spring carriers mounted at opposite ends of the columnar member in free rotational relation thereto, two sets of closely coiled helical springs, each set extending between the base member and one of the spring carriers, the springs of each set, when the mount is unloaded, being under no longitudinal tension, lying with their axes substantially on the surfaces of two identical opposed cones and having their points of attachment to the spring carriers offset circumferentially and to a uniform extent in relation to their points of attachment to the base member when the mount is unloaded.

2. A vibration isolator and shock mount in accordance with claim 1 including stop members attached to the opposite ends of the columnar member adjacent the spring carriers, said stop members having portions overlying the edges adjacent the aperture of the base member when the mount is in unloaded condition and adapted to limit the movement of the columnar member in axial direction.

3. A vibration isolator and shock mount comprising an apertured base member, a columnar member extending through the aperture in the base member, stop members secured at opposite ends of the columnar member adapted for limiting axial movement of the columnar member with respect to the base member, vibration isolation means interconnecting said base and columnar members, said vibration isolation means including spring carriers secured in fixed axial relation adjacent said stop members at opposite ends of the columnar member, said spring carriers being rotatable about said columnar member, two sets of closely coiled helical springs, each set extending between the base member and one of the spring carriers, the springs of each set, when the mount is unloaded, being under no longitudinal tension, lying with their axes on the surfaces of two identical opposed cones and having their points of attachment to the spring carriers offset circumferentially and to a uniform extent in relation to their points of attachment to the base member, and damping means including ring members surrounding and movable along the columnar member and spring means urging the ring members apart and into frictional engagement with the helical coil springs of each set.

4. A vibration isolator and shock mount in accordance with claim 3 wherein the stop members at opposite ends of the columnar member comprise substantially rigid members extending laterally from the columnar member and resilient spring members underlying said rigid members with their outer ends spaced from the ends of the rigid members.

5. A vibration isolator and shock mount in accordance with claim 3 wherein the ring members of the damping means are formed from resilient material.

6. A vibration isolator and shock mount in accordance with claim 3 wherein the ring members of the damping means are formed from resilient material and are slit radially.

References Cited in the file of this patent
UNITED STATES PATENTS 2,600,090    Barber et al.  ----------- June 10, 1952